Figure 3:
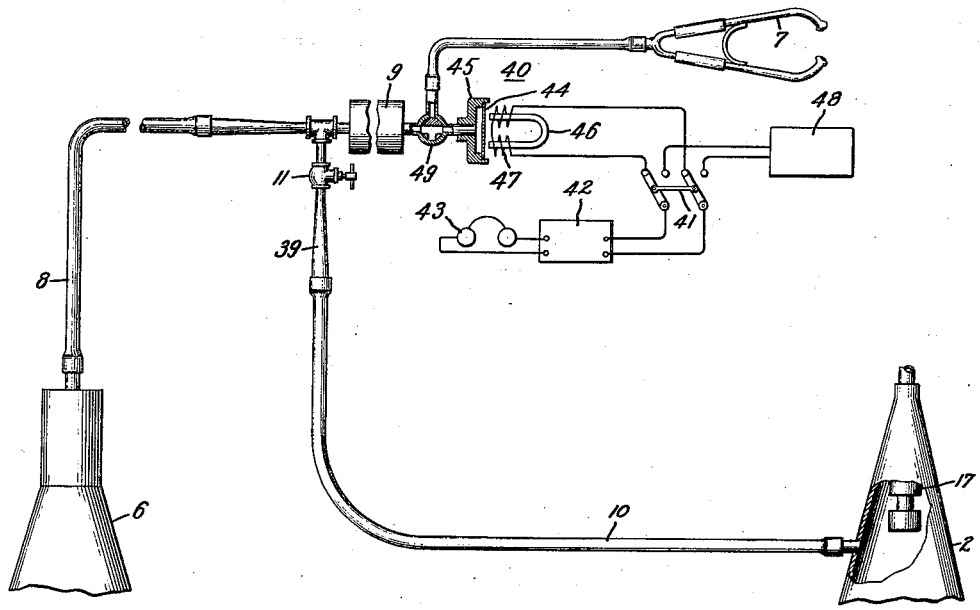

Oct. 8, 1935.   C. W. RICE   2,016,906
SOUND WAVE APPARATUS
Filed April 22, 1931   2 Sheets-Sheet 1
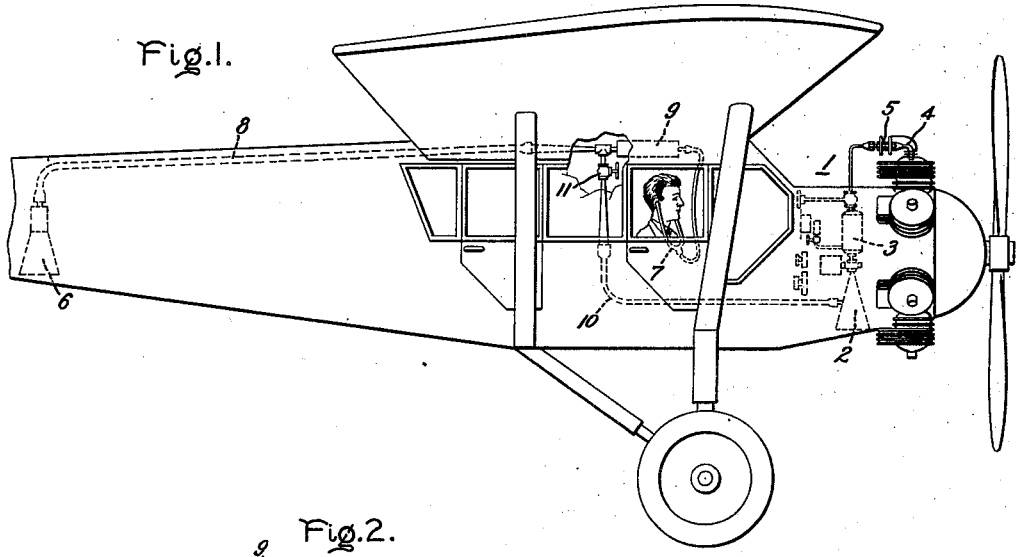
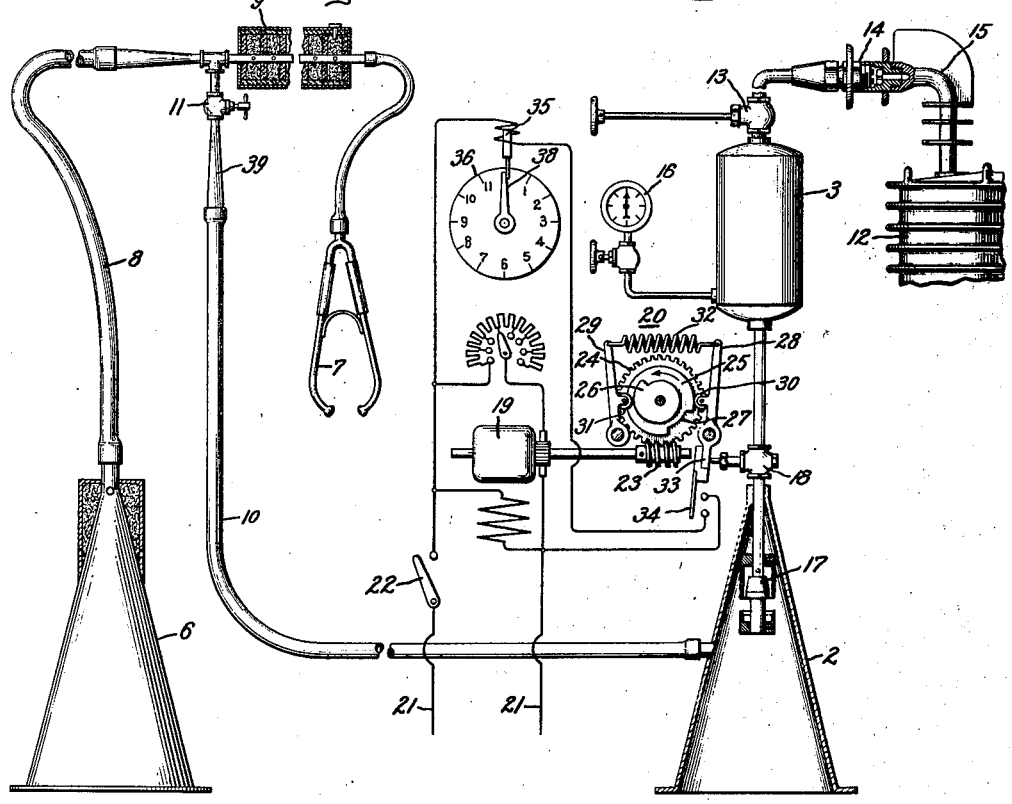
Inventor:
Chester W. Rice,
by Charles E. Muller
His Attorney.

Oct. 8, 1935.                C. W. RICE                2,016,906
                          SOUND WAVE APPARATUS
                         Filed April 22, 1931            2 Sheets-Sheet 2

Inventor:
Chester W. Rice,
by Charles E. Tullar
His Attorney.

Patented Oct. 8, 1935

2,016,906

UNITED STATES PATENT OFFICE 2,016,906

SOUND WAVE APPARATUS

Chester W. Rice, Schenectady, N. Y., assignor to General Electric Company, a corporation of New York Application April 22, 1931, Serial No. 532,006

10 Claims. (Cl. 181—0.5)

My present application is a continuation in part of my copending application, Serial No. 461,620, filed June 16, 1930, entitled Sound wave apparatus, and issued November 29, 1932 as Patent 1,889,614.

My present invention relates to sound echo apparatus and more particularly to a method and means whereby such apparatus may be employed to greater advantage than heretofore for the purpose of determining altitudes from aircraft.

It has for one of its objects to provide a sound wave echo apparatus for use particularly for the purpose of determining altitudes from aircraft and in which a more natural effect is produced upon the ear of the observer than has heretofore been possible.

In sound echo apparatus of the type indicated a sound wave transmitter and a sound wave receiver are arranged upon the craft, the receiver being arranged to receive sound wave impulses from the transmitter both directly, as through extraneous paths about the craft and also through reflection from the earth. The time interval between the arrival at the receiver of sound impulses received directly from the transmitter and those received through reflection serves as an indication of the altitude.

It is necessary however in equipment of this type that the indication produced be one which may be observed and interpreted into units of altitude with the least amount of thought or concentrated attention on the part of the pilot. The conditions under which observations are made are frequently those of flying through fog and clouds for the purpose of effecting a landing. The pilot is not only likely to be under a certain amount of nervous tension but his attention is directed to the operation of his craft and to seeking the first sight of land, trees, buildings, etc. through the fog and clouds. Accordingly, the pilot is not free to give concentrated attention to observations of altitude and unless his equipment is such that the observation can be readily made it is likely to be of little value.

I have found that the ease with which observations may be made with equipment of the type indicated is dependent to a large extent upon the relative intensity of the sound produced in the receiver due to sound waves received directly from the transmitter and that due to sound waves received through reflection from the earth. One naturally expects that the echo will be of less intensity than that of the sound received directly from the transmitter and I have found that if this condition is not true in the equipment an unnatural and confusing impression is produced upon the ear of the pilot with the result that the altitude is determined only after concentrated attention. If on the other hand the intensity of sound produced in the receiver due to waves received directly from the craft can be so adjusted that it is always of greater intensity than the sound produced due to reflected waves when the craft is above a certain predetermined low altitude, then the impression on the ear is a natural one and the observation may be made with very little thought or attention by the pilot.

For best operation it has been observed that the intensity of the sound produced in the receiver due to sound waves received directly from the transmitter should be greater than that produced due to reflected waves when the craft is above an altitude at which the two sound impulses appear to blend. That is, the relative intensities should be so adjusted that as the craft descends the indication received in the receiver is one of two successive short impulses of different intensity spaced apart by a time interval dependent upon the altitude; whereas at a certain low altitude where the two impulses appear to blend the indication changes to one comprising a continuous long impulse of uniform intensity. This altitude should be one of from five to ten feet above the ground and at which the pilot may operate his controls to allow the plane to settle to the ground.

One of the objects of my present invention, therefore, is to provide means whereby sound is produced in the receiver simultaneously with the transmission of sound from the transmitter having intensity which is adjustable with respect to the intensity of the received echo.

A further object of my invention is to provide a composite path, as distinct from extraneous paths, whereby sound is transferred from the transmitter directly to the receiver. This path may be either entirely acoustic or it may comprise electrical means which operate through electrical reproduction to produce sound of desired intensity in the receiver.

Figure 4:
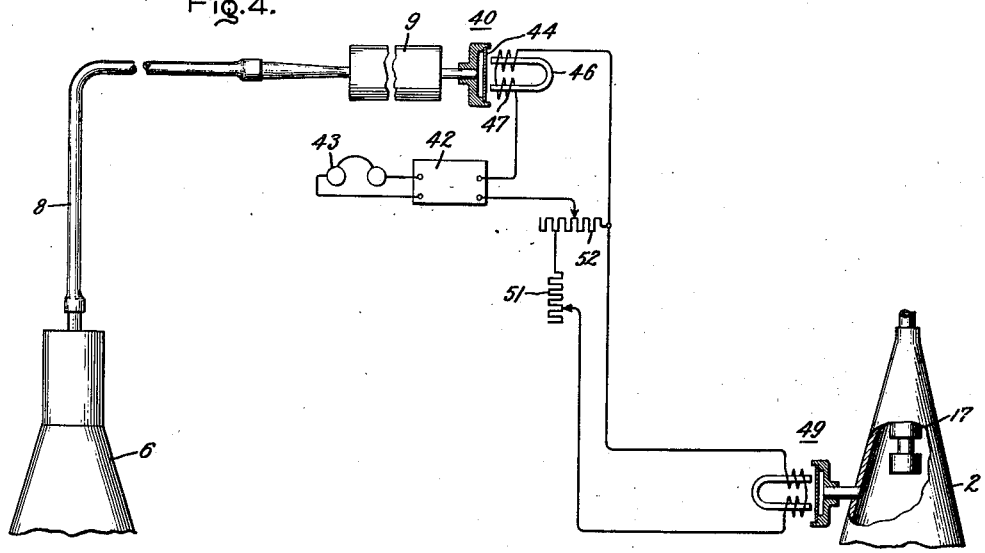

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings in which Fig. 1 represents an aircraft having mounted thereon an equipment embodying my invention; Fig. 2 shows the equipment in greater detail, and Figs. 3 and 4 show modifications thereof.

Referring to Fig. 1 of the drawings, I have shown therein an aircraft having a sound wave transmitter 1 arranged at the forward portion thereof, this transmitter comprising a directive transmitting megaphone 2 having arranged therein, as will later be described, a sound producing device which is supplied with gas under pressure from a reservoir 3. Gas in the reservoir is obtained under pressure from one of the engine cylinders through a cooling device indicated at 4 and a check valve indicated at 5.

Also arranged upon the craft is a receiver comprising a receiving megaphone indicated at 6 and a stethoscope 7 worn by the operator, the stethoscope being connected to the receiving megaphone through a connection including an acoustic channel 8 and an acoustic filter 9. Connected between the transmitting megaphone 2 and the receiver is an acoustic channel 10 which is arranged to carry sound waves from the transmitter directly into the receiving channel whereby they are heard by the observer with his stethoscope. The intensity of sound transmitted from the transmitter to the receiver through the channel 10 may be controlled by means of a valve 11 arranged within easy reach of the operator.

This equipment is shown in greater detail in Fig. 2 in which I have indicated at 12 one of the engine cylinders from which gas is derived for storage under pressure in the reservoir 3. This reservoir is connected to the cylinder through a manually controlled valve 13, an automatic pressure operated valve 14 and a cooling unit 15. The valve 13 of course is arranged to be controlled from the cockpit 8 and may be kept closed during times when the apparatus is not in use. The check valve 14 may be of any suitable construction arranged to emit gas from the cylinder into the reservoir upon the firing stroke of the piston. I have found that the valve preferably should be protected against the hot gases within the engine cylinder by means of a cooling unit. This unit comprises a section of pipe 15 having heat conducting cooling flanges of large area made integral therewith, thereby to radiate, conduct and convey heat from the pipe 15. In this way the life of the pressure operated valve 14 may be very greatly increased.

Pressure of gases in the reservoir 3 may be observed in the cockpit by means of a pressure gauge 16.

Preferably the reservoir 3 is arranged above the transmitting megaphone 2 and the sound producing device, or whistle, 17 which is arranged therein and which is connected to the reservoir 3 through a valve 18. In this way any liquid which forms in the reservoir 3 due to condensation of fuel gases, water vapor, etc. is drained and blown out through the whistle 17.

The valve 18 is automatically controlled by means of a motor 19 through an operating mechanism 20 to supply pressure impulses to the whistle 17 thereby to transmit sound wave impulses toward the earth. The motor 19 is arranged to be energized from a suitable supply circuit 21 through a switch 22 and is arranged to rotate a worm 23 and cooperating worm gear 24. Mounted concentrically with the worm gear 24 are a pair of cams 25 and 26. The cam 25 is substantially circular but has a notch 27 of suitable width cut from one portion of the circumference. The periphery of the cam 26 is of progressively increasing radii starting from a point about opposite the notch 27 in the cam 25. Two levers 28 and 29 are pivoted respectively on opposite sides of and below the cams 25 and 26. Each of these levers carries a roller 30 and 31 respectively which are arranged to bear against the respective cams 25 and 26 when the upper ends of the levers are drawn together as by means of a spring 32. The lever 28 has an arm 33 which extends below the pivot point and bears against the actuating member of the valve 18. This lever is also arranged by means of a contact 34 to complete an electrical circuit to the releasing magnet 35 on an electric timer 36.

The operation of this mechanism is as follows: When the switch 22 is closed, and the motor energized, the cams 25 and 26 are rotated in a counter-clockwise direction through the worm 23 and worm gear 24. After a slight rotation from the position shown the roller 30 drops into the notch 27 thereby allowing the lever 28 to be rocked in a counter-clockwise direction by the spring 32. The arm 33 then opens the valve 18 causing gases under pressure to be supplied to the whistle 17. Upon a slight further rotation of the cam 26 the roller 31 drops from a point on the periphery of cam 26 having large radius to a point of small radius thereby releasing the tension on the spring 32. Then upon a slight further rotation of the cam 25 the roller 30 engages the opposite end of the notch 27 and is raised out of the notch thereby causing the lever 28 to be rocked clockwise to the position shown in the drawings. The valve 18 is thus again closed. The spring is then again tensioned by rotation of cam 26.

In this way the valve 18 is positively opened and closed to supply a short blast of gas to the whistle 17 upon each rotation of the cams. The mechanism described is peculiarly adapted for this purpose due to the fact that the energy necessary for operation of the valve is first stored in the spring 32 and is then suddenly released to cause actuation of the valve. This has the advantage that the motor 19 may be of small size and weight since the storage of energy in the spring 32 takes place at a comparatively slow rate. The system avoids the use of such energy storage devices as a fly-wheel, for example, or other equipment of heavy weight, which cannot conveniently be carried upon an aircraft.

When the valve 18 is opened the contact 34 closes the circuit of the releasing magnet 35 on the timer 36. This timer comprises an index 38 which when released by the magnet 35 rotates at a uniform rate over a dial and at such a speed that it makes a complete revolution between the different transmitted impulses. This index may of course be operated by any suitable means such as a clock motor. The operator, upon noting that the index 38 is released, will then observe the position upon the dial which the index occupies when the echo is received in the receiver and from the angle of rotation of the index 38 the altitude may be determined. The dial of course may be calibrated in any arbitrary manner or in terms of altitude.

The use of the timer to determine altitude is of course optional with the observer one of the advantages of my present invention being greatly to reduce the necessity for its use. By producing sound in the receiver in response to the transmitted impulse through means independent of the echo effect and having intensity greater than sound produced by the echo the pilot may readily determine his altitude without the use of any visual indicating means. Thus his eyes are left free to scan the space about the craft for any sight of land, or obstruction to his flight.

The acoustic connection 10 may comprise an aluminum tube, for example, about 1 inch in diameter extending from the transmitting megaphone 2 to the receiving channel. The connection to the receiving channel should be made at a point on the opposite side of the acoustic filter 9 from the stethoscope so that any engine noises or other noises about the craft which may penetrate the receiving channel through the channel 10 are eliminated by the filter 9. As shown in the drawing the connection is made at the entrance end of the filter. Since the filter comprises a pipe of about 3/8" in diameter the connection to the channel 10 is preferably made through a section of pipe 39 which tapers toward the receiving channel thereby to provide a suitable impedance fit between the channel 10 and the receiving channel. The valve 11 is suitably placed at the smaller end of the section 39.

Further details with reference to the construction and operation of the equipment have been fully explained in my above mentioned patent and will not be explained here although I desire to point out that the frequency of the waves produced by the whistle 17 is preferably higher than the principal sounds about the craft as for example from 2000 to 4000 cycles. The filter 9 readily transmits sound waves of these frequencies of the stethoscope and eliminates sound waves having the frequency of the principal sounds about the craft.

It has been found that the use of the composite channel 10 between the transmitting megaphone 2 and the receiving channels is of great importance in facilitating the determination of altitude from indications which are produced in the stethoscope in that it provides a means whereby the relative intensity of sound produced in the stethoscope due to waves received from the transmitter through paths independent of reflection from the earth and sound which is produced due to the echo waves may be adjusted in such a way as to produce the most natural and most easily interpreted indications. With the intensity properly adjusted a very natural impression of transmitted sound and echo can be produced upon the ears of the operator thereby greatly facilitating the observation.

In Fig. 3 I have shown a modification of my invention in that the receiving channel is terminated in a magnetophone 40 the electrical winding of which is connected through a double-throw switch 41 and audio amplifier 42 to a pair of headphones 43 worn by the operator. The magnetophone 40 comprises a stretched diaphragm 44 having an enclosed chamber 45 at one side thereof opening into the receiving channel. On the opposite side of the diaphragm is arranged a permanent magnet 46 having an electric winding arranged thereon. The sound waves in the receiving channel cause vibration of the diaphragm 44 which in turn excites oscillations of corresponding frequency in the winding 47 thereby producing sound waves from the headphones 43. This modification of the invention is of advantage on aircraft carrying radio receivers in that the headphones are normally provided in connection with the receiver and are worn by the operator. Such a radio receiver is indicated by the rectangle 48 and may be connected to the amplifier 42 by throwing the switch 41 to its right hand position. Thus if the operator wearing the headphones for purposes of radio reception of beacon signals for example desires to determine altitude he may merely throw the switch 41 to its left hand position and make the observation without removing the headphones from his ears. In order that the indication may be made by means of a stethoscope as well a three-way valve 49 is included in the connection between the magnetophone 40 and the filter 9. By rotating this valve through 90° the magnetophone may be disconnected from the receiving channel and the stethoscope connected thereto. The three-way valve 49 may be of any suitable construction but should be one the dimensions of which are sufficiently small to prevent any inherent resonance effects therein.

In Fig. 4 I have shown a further modification of the invention but in which sound is transferred from the transmitter to the receiver through an electrical path as distinct from an acoustic path as shown in Figs. 1, 2, and 3. A magnetophone 49 of the construction above described has its air chamber connected to the transmiting megaphone 2. Its electrical winding is connected to the input of the amplifier 42 through a series resistance 51 and a potentiometer 52. This potentiometer 52 is also included in circuit with the input to the amplifier 42 and the electric winding of the magnetophone 40 which is connected with the receiving channel. In this way any electromotive forces which are excited in the windings of magnetophones 40 and 49 due to sound produced in the corresponding acoustic channels are supplied to the amplifier 42, amplified thereby and supplied to the headphones 43 wherein the respective sound waves are reproduced. The relative intensity of sound produced in the headphones 43 due to the reflected wave and the waves received directly from the transmitter may be adjusted by means of the resistance 51 and potentiometer 52.

While in connection with Figs. 3 and 4 I particularly mention the use of magnetophones for the purposes indicated, it will be understood that many other types of electro-acoustic pick-up devices may be employed. A magnetophone of the type indicated is preferable, however, since it is of very rugged construction and is relatively insensitive to vibration of the craft. It possesses the further important characteristic that the electromotive force induced in the winding thereof is proportional to the velocity of movement of the diaphragm with the result that the device is relatively insensitive to low frequency noises about the craft, whereas it is highly sensitive to sound waves of high frequency. Further, by properly stretching the diaphragm of the magnetophone the device may be given a tuning characteristic whereby it is rendered far more sensitive at a particular frequency than at other frequencies. For my present purposes this frequency of maximum sensitivity may be adjusted at the frequency of the whistle 17 which may for example be in the neighborhood of 3000 cycles.

While I have shown particular embodiments of my invention it will of course be understood that I do not wish to be limited thereto since many modifications may be made in the equipment shown and I contemplate by the appended claims to cover any such modifications as fall within the true spirit and scope of my invention.

What I claim as new and desire to secure by Letters Patent of the United States, is:

1. The method of indicating altitude from an aircraft which includes, transmitting sound impulses from the craft toward the earth, supplying said sound wave impulses to the ear of the operator through a path about the craft and through reflection from the earth, and so controlling the sound wave impulse supplied to the ear of the operator through said path about the craft that it is of intensity substantially equal to the intensity of the impulse supplied through reflection from the earth at that altitude at which the two impulses appear to blend into a single impulse and that at higher altitudes it is of greater intensity than the impulse supplied through reflection from the earth.

2. The combination, in an altitude indicating device for aircraft, of a sound wave transmitter and a sound wave receiver arranged on the craft, said receiver being worn on the ear of the observer and arranged to receive sound waves from said transmitter substantially simultaneously with their production in said transmitter and also after reflection from the earth, means to transmit sound wave impulses from said transmitter at such a rate that each impulse and its echo are received in said receiver as sounds distinct from each other impulse and its echo, and means to adjust the relative intensities of each sound impulse received in said receiver and its echo to produce a natural sound and echo effect upon the ear of the observer.

3. The combination, in an altitude indicating device for aircraft, of means on the craft for transmitting sound wave impulses, said sound wave impulses being separated by time intervals of greater duration than the time required for waves to travel to the earth and back from the altitudes to be measured, an ear piece worn by the operator, means to produce sound waves in said ear piece in response to sound produced in said transmitter, means in addition to said last means to receive sound waves from said transmitter after reflection from the earth and through extraneous paths independent of such reflection and to produce sound waves in said ear piece in response to said received sound waves, the sound waves produced in said ear piece by the first of said last two means being produced substantially simultaneously with sound produced therein by the second of said two means in response to sound waves received through said extraneous paths, and means for adjusting said first of said two means to vary the intensity of sound produced thereby in said ear piece to cause the effect of a natural echo to be produced upon the ear of the operator when in the range of altitudes to be measured.

4. The combination, in an altitude indicating device for aircraft, of a sound wave transmitter and a sound wave receiver arranged on the craft, said transmitter being adapted to transmit impulses at intervals greater than the time required for each impulse to travel to the earth and back, said receiver including means to receive sound waves from the transmitter after reflection from the earth, and through such extraneous paths as exist between the transmitter and receiver independently of such reflection, whereby each transmitted impulse and its echo, are received in said receiver distinctively from each other sound impulse, and its echo and an additional path arranged on the craft between the transmitter and receiver, said path being arranged to produce sound waves in the receiver in response to sound waves produced by the transmitter and substantially simultaneously therewith, and means for adjusting the intensity of sound waves produced in said receiver through action of said additional path.

5. The combination, in an altitude indicating device for aircraft, of a sound wave transmitter and a sound wave receiver arranged on the craft, said receiver including a listening device arranged to receive sound from the transmitter directly and also through reflection from the earth, and means for adjusting the relative intensity of sound received in said receiver directly from the transmitter and through reflection from the earth, said means comprising an adjustable, composite, acoustic path between said transmitter and receiver and adapted to transmit sufficient sound to said receiver to cause the sound produced therein independently of reflection to exceed that produced by reflection by an amount sufficient to produce a natural sound and echo effect in said listening device.

6. The combination, in an altitude indicating device for aircraft, of a sound wave transmitter and a sound wave receiver arranged on the craft, said receiver including a listening device arranged to receive sound from the transmitter after reflection from the earth, and means directly responsive independently of reflection to sound waves in the transmitter for electrically reproducing said sound waves in the receiver, and means for adjusting the intensity of the reproduced sound waves to cause said reproduced waves to exceed in magnitude the waves received through reflection to produce a natural echo effect in said listening device.

7. The combination, in an altitude indicating device for aircraft, of a sound wave transmitter arranged to transmit sound wave impulses from the craft toward the earth, a sound wave receiver arranged on the craft to receive said impulses after reflection from the earth, means for producing sound impulses in the receiver simultaneously with the transmission of sound impulses from the transmitter, and means for adjusting said last means to produce sound wave impulses having intensity greater than the intensity of sound impulses produced in the receiver by reflection from the earth at all altitudes of the craft except altitudes below which sound impulses produced in the receiver by said means and by reflection from the earth appear to blend into a continuous impulse.

8. The combination, in an echo apparatus for determining altitudes from aircraft, of means for transmitting sound wave impulses from the craft toward the earth, means for receiving said impulses directly from said transmitting means substantially simultaneously with their production therein and also after reflection from the earth, said means including a listening device, the time interval between said impulses transmitted by said transmitter being sufficiently great to permit reception of each reflected impulse prior to transmission of the next succeeding impulse, and means to control the intensity of sound waves received in said receiving means directly from said transmitting means to produce the effect of a natural echo in said listening device.

9. The combination, in an echo apparatus for determining altitudes from aircraft, of a listening device, a transmitting megaphone, a receiving megaphone, an acoustic channel including an acoustic filter between said receiving megaphone and said listening device, and an acoustic channel connected between said transmitting megaphone and a point on said first acoustic channel between said receiving megaphone and said acoustic filter, said filter being adapted to attentuate undesired sound waves produced about the craft and received through either of said acoustic channels.

10. The combination, in an echo apparatus for determining altitudes from aircraft, of a listening device, a transmitting megaphone, a receiving megaphone, an acoustic channel including an acoustic filter between said receiving megaphone and said listening device, and a second acoustic channel connected between said transmitting megaphone and a point on said first acoustic channel between said receiving megaphone and said acoustic filter, said filter being adapted to attenuate undesired sound waves produced about the craft and received through either of said acoustic channels, said second acoustic channel being adapted to transmit desired sound waves with sufficient intensity to produce the effect in said listening device of a natural echo.

CHESTER W. RICE.

CERTIFICATE OF CORRECTION.

Patent No. 2,016,906.  October 8, 1935.

CHESTER W. RICE.

It is hereby certified that error appears in the printed specification of the above numbered patent requiring correction as follows: Page 3, first column, line 32, for "of" read to; and line 37, for "channels" read channel; page 4, first column, line 66, claim 4, strike out the comma after "echo"; and line 68, same claim, before "and" strike out the comma and insert the same after "echo" in same line; and that the said Letters Patent should be read with these corrections therein that the same may conform to the record of the case in the Patent Office.

Signed and sealed this 19th day of November, A. D. 1935.

(Seal)

Leslie Frazer
Acting Commissioner of Patents.

CERTIFICATE OF CORRECTION.

Patent No. 2,016,906.  October 8, 1935.

CHESTER W. RICE.

It is hereby certified that error appears in the printed specification of the above numbered patent requiring correction as follows: Page 3, first column, line 32, for "of" read to; and line 37, for "channels" read channel; page 4, first column, line 66, claim 4, strike out the comma after "echo"; and line 68, same claim, before "and" strike out the comma and insert the same after "echo" in same line; and that the said Letters Patent should be read with these corrections therein that the same may conform to the record of the case in the Patent Office.

Signed and sealed this 19th day of November, A. D. 1935.

(Seal)

Leslie Frazer
Acting Commissioner of Patents.